US005573810A

United States Patent [19]

Grubka

[11] Patent Number: 5,573,810

[45] Date of Patent: Nov. 12, 1996

[54] METHOD OF APPLYING MICROORGANISM RESISTANT GRANULES TO A CONTINUOUSLY MOVING STRIP OF ASPHALT COATED MATERIAL

[75] Inventor: Lawrence J. Grubka, Heath, Ohio

[73] Assignee: Owens-Corning Fiberglas Technology Inc., Summit, Ill.

[21] Appl. No.: 309,707

[22] Filed: Sep. 21, 1994

[51] Int. Cl.[6] .............................. B05D 1/12; B05D 1/36; B32B 11/12

[52] U.S. Cl. .......................... 427/186; 427/199; 427/201; 427/205; 428/143; 428/148; 428/907

[58] Field of Search .................................... 427/186, 187, 427/188, 199, 201, 205, 202; 428/143, 148, 150, 206, 208, 907; 52/315

[56] References Cited

U.S. PATENT DOCUMENTS 1,612,885 1/1927 Robinson ................................ 428/158
3,507,676 4/1970 McMahon .
3,528,842 9/1970 Skadulis ................................ 428/145
3,598,627 8/1971 Klimboff ................................ 52/518
4,092,441 5/1978 Meyer et al. ............................ 427/37
4,617,198 10/1986 Overturf ................................ 427/186
4,900,589 2/1990 Montgomery ........................... 427/188
5,356,664 10/1994 Narayan et al. ........................ 427/186

*Primary Examiner*—Shrive Beck
*Assistant Examiner*—Fred J. Parker

[57] ABSTRACT

A method of manufacturing a microorganism resistant asphaltic roofing shingle includes supplying a tacky asphaltic strip material having a prime lane, and applying prime granules onto the prime lane to substantially cover the prime lane so that approximately all of the prime granules adhere to the asphaltic strip material. An excessive amount of backfall granules are applied onto the prime lane on top of the prime granules. Prior to applying the prime granules onto the prime lane of the asphaltic strip material, anti-microorganism granules are applied onto the prime lane so that nearly 100 percent of the anti-microorganism granules adhere to the asphaltic strip material.

19 Claims, 1 Drawing Sheet

METHOD OF APPLYING MICROORGANISM RESISTANT GRANULES TO A CONTINUOUSLY MOVING STRIP OF ASPHALT COATED MATERIAL

FIELD OF INVENTION

The present invention relates generally to asphalt roofing shingles and their manufacture, and more particularly to a method of applying microorganism resistant granules to a continuously moving strip of asphalt coated material which is suitable for use as roofing shingles.

BACKGROUND OF THE INVENTION

A common method of manufacturing asphalt roofing shingles involves producing a continuous strip of granule covered asphaltic shingle strip material which is subsequently cut into individual roofing shingles. To produce the asphaltic strip material, either an organic felt, a glass fiber mat, or other suitable substrate is coated with hot, liquid asphalt, or a liquid asphalt and filler mixture. This may be accomplished by passing the substrate material through a coater containing the liquid asphalt, or the asphalt may be sprayed or otherwise applied to the substrate. The hot, tacky asphaltic strip is subsequently passed beneath one or more granule applicators or hoppers which apply the protective and/or aesthetically pleasing surface granules to the asphaltic strip material.

The manufacture of shingles from such an asphalt coated strip generally involves dispensing at least two different types of granules. "Headlap" granules, which are relatively low in cost and primarily serve the functional purpose of protecting the underlying asphalt material, are applied to a shingle at regions which will ultimately be covered by adjacent shingles when installed upon a roof. Colored granules or other "prime" granules are relatively expensive and are applied to the shingle at regions which will ultimately be visible when the shingles are installed upon a roof. Prime granules are disposed upon the asphalt strip for both the functional purpose of protecting the underlying asphalt strip and for the purpose of providing an aesthetically pleasing roof. In a typical shingle manufacturing process, the continuous asphalt coated strip may be sufficiently wide to allow for each predetermined length of the strip to be cut into several roofing shingles of such predetermined length. A traditional size for a roofing shingle is three feet by one foot. For example, some plants utilize an asphaltic strip which is sufficiently wide to allow three, one foot wide shingles of a predetermined length to be cut from each such length of asphaltic strip. However, other plants utilize an asphaltic strip which is sufficiently wide to allow four, five, or six, one foot wide shingles to be cut from each length. In the manufacturing process, the asphaltic strip is conceptually divided into an equal number of prime lanes, and headlap lanes. Prime lanes receive an application of prime granules while headlap lanes receive an application of headlap granules. In a three shingle wide configuration, the asphalt coated strip therefore is divided lengthwise into six lanes, three headlap lanes and three prime lanes. When a desired length of the asphalt coated strip is cut into three shingles, each shingle will be comprised of a length of headlap lane and the adjacent length of prime lane.

One problem commonly facing homeowners and others having asphalt shingled roofs, among other types of roofs, has been the growth of algae and fungus on the exposed surfaces of the roof. On a roof covered with asphalt shingles, this problem manifests itself as severe discoloration of the exposed shingle surfaces. Although this algae and fungus growth is especially prevalent in the Gulf Coast area of the United States and other warm and humid climates, it has also been found to occur in the northern regions of the United States. The discoloration generally becomes visibly apparent during the second or third year after the roofing shingles have been applied, beginning as dark spots which develop into dark streaks which eventually cover a majority of the roof. For aesthetic and sun reflective purposes, granules disposed upon the exposed or prime portions of roofing shingles are often white or light-colored and such fungus or algae or other microorganism growth on a light-colored or white shingle is particularly noticeable and unsightly.

To combat the problems associated with the growth of fungus, algae, and other microorganisms upon the exposed surfaces of roofing shingles, it is generally known to include, upon the exposed surfaces of the shingles, granules composed of or containing copper and/or other metals such as zinc, or particles of metallic zinc or copper. When wetted by rain or otherwise, such granules release copper and zinc compounds respectively which act as algicides and/or fungicides to inhibit the growth of algae and/or fungus. Such copper, zinc, or other metallic compound containing granules are very expensive, even when compared to ordinary prime or colored granules. They also may not be the same color as the prime granules being used. Therefore for aesthetic and economic reasons, the exposed surfaces of such algae and fungus resistant shingles contain primarily ordinary colored "prime" granules and a relatively small percentage of the expensive copper or zinc containing granules interspersed among the ordinary prime granules.

To minimize costs and to maximize algae and fungus fighting effectiveness, it is generally desirable to have a predetermined percentage of the anti-microorganism copper or zinc containing granules disposed upon the prime surface of each shingle. Such granules have heretofore been mixed with the prime granules to this predetermined percentage by weight or volume and applied with the ordinary prime granules to the prime lanes of the strip of asphalt covered material. However, because of normal variations in the manufacturing process, the weight of prime granules applied to each length of the various prime lanes of the asphalt strip can vary. This variance necessarily causes a deviation from the desired predetermined percentage of copper or zinc containing granules being disposed upon the prime areas of the asphalt strip. This results in some shingles having more copper, zinc, or other such microorganism resistant granules than is necessary while others may have an insufficient amount of such granules as is necessary to effectively fight fungus and/or algae.

In addition, the manufacture of roofing shingles necessarily involves dispensing more granules onto the asphalt coated strip than are necessary to coat the strip. This excess ensures that all areas of the strip are coated to provide a superior shingle, and prevents the hot, tacky asphalt coated strip from contacting and sticking to the rollers of a manufacturing production line. After the initial application of granules, the continuous strip of asphalt and granule coated material is passed around an apparatus for removing these excess or "backfall" granules. This apparatus is commonly a large diameter drum referred to as a slate drum. Backfall granules are collected in a backfall hopper and are reapplied to the asphalt coated strip. In the process of removing the excess prime and headlap granules, it is possible to keep the backfall headlap granules from commingling with the backfall prime granules. This is desirable because such granules can then be re-applied through the backfall hopper to the appropriate lanes of the strip of asphaltic material. It would be undesirable to apply backfall headlap granules to the prime lanes of the asphaltic coated strip. However, the process of preventing the backfall headlap granules from commingling with the backfall prime granules necessarily causes some backfall prime granules to become commingled with the backfall headlap granules. This results in some of the backfall prime granules being applied to the headlap lanes of the asphaltic strip through the backfall hopper. Such application of the relatively expensive backfall prime granules to the headlap regions of the asphaltic strip is referred to as the "downgrading to headlap" of the prime granules. This also causes some of the very expensive anti-microorganism granules which were mixed with and applied simultaneously with the ordinary prime granules to be "downgraded to headlap" where their algicidal or fungicidal properties are not needed and are not helpful.

SUMMARY OF THE INVENTION

The present invention is therefore directed to a method of manufacturing a microorganism resistant roofing shingle comprising the steps of supplying a continuous strip of asphalt coated material having at least one prime lane; applying anti-microorganism granules to the at least one prime lane of the continuous strip of asphalt coated material; and applying at least a second type of granule to the at least one prime lane of the continuous strip of asphalt coated material. By applying the anti-microorganism granules to the tacky asphalt-coated strip prior to applying the prime granules, nearly 100 percent of the anti-microorganism granules will be adhered to the prime areas of the shingle, and there will be virtually no waste of the expensive anti-microorganism granules. The continuous strip of asphalt coated material preferably also includes at least one headlap lane, and the process preferably further comprises the step of applying headlap granules to this headlap lane.

In a preferred embodiment, the anti-microorganism granules are copper containing granules while the second type of granule applied to the prime lanes is an ordinary colored or other type of prime granule.

The anti-microorganism granules may be dispensed from a roll-type hopper such as a fluted roll hopper including means for controlling the quantity of granules dispensed therefrom. In a preferred embodiment, such means for controlling the quantity of granules dispensed from a fluted roll hopper may include gate means disposed at the output area of such a hopper. As another means to control the output from such a feeder, the speed at which the fluted roll rotates may be varied, manually or by means of computer control, in relation to the speed of the asphaltic strip moving past the hopper.

In another preferred embodiment, the anti-microorganism granules are dispensed from a vibratory feeder including means for controlling the quantity of granules dispensed therefrom. The means for controlling the quantity of granules dispensed from such a vibratory hopper may be a weigh scale or loss-in-weight feeder to control the feed or input stream of granules into the vibratory feeder. In another preferred embodiment, the vibratory feeder is overfed or "choke" fed with anti-microorganism granules and the rate at which they are dispensed from the feeder is controlled by varying the vibratory action of the feeder. The vibratory feeder may also contain a gate at its output region or orifice to control the output of the feeder. The gate opening is preferably preset while the vibratory action of the feeder is preferably variable and automatically changes depending upon the speed at which the strip of asphaltic material moves beneath the feeder.

The present invention therefore allows for the accurate application, in terms of quantity and location, of anti-microorganism granules upon the prime lanes of the moving strip of asphalt coated strip material, such that the anti-microorganism granules will stick to the prime lanes and not become downgraded to headlap granules due to backfall operations. Precise amounts of anti-microorganism granules are applied to each shingle to render their use more cost-effective.

The present invention also relates to a microorganism resistant shingle manufactured according to process disclosed herein.

DETAILED DESCRIPTION OF THE PREFERRED EMBODIMENT

Figure 1:
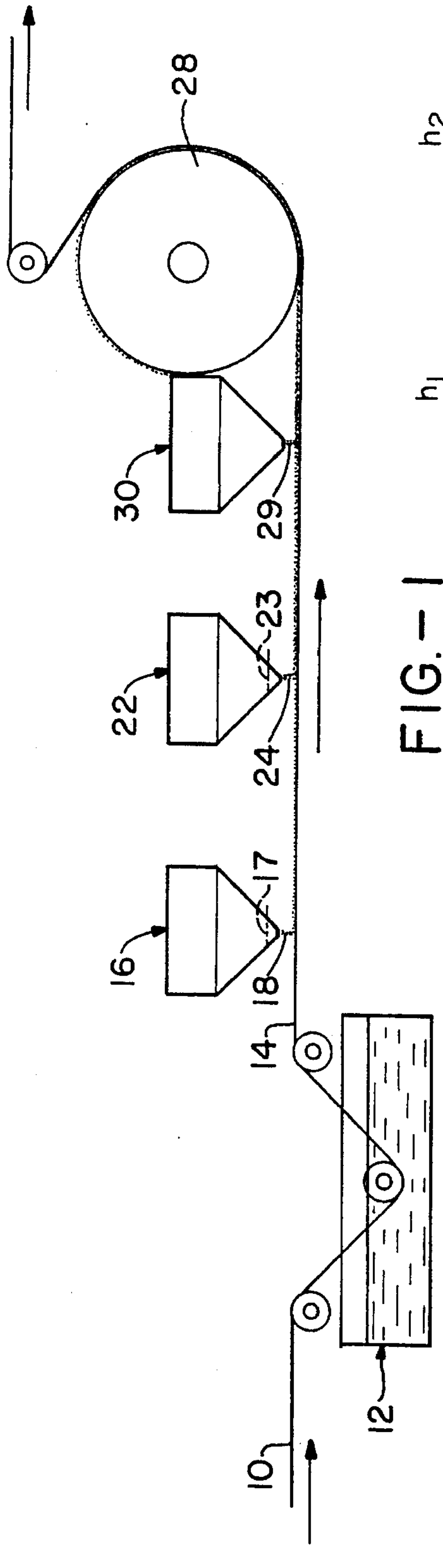
FIG. 1 is a schematic view in elevation of an apparatus employing the method of the present invention.

As shown in FIG. 1, a substrate or base sheet 10 is passed, using means known in the art, through coater 12 containing liquid asphalt, or a mixture of liquid asphalt and filler material as is known in the art. The coater maintains the asphalt compound at an elevated temperature to create a continuous strip of hot, tacky, asphalt coated material or asphaltic strip 14. Asphalt mixture may alternatively be sprayed onto one or both sides of base sheet 10. Substrate or base sheet 10 is preferably made from a glass fiber mat although organic felt or other suitable materials as are known in the art may be utilized.

Figure 2:
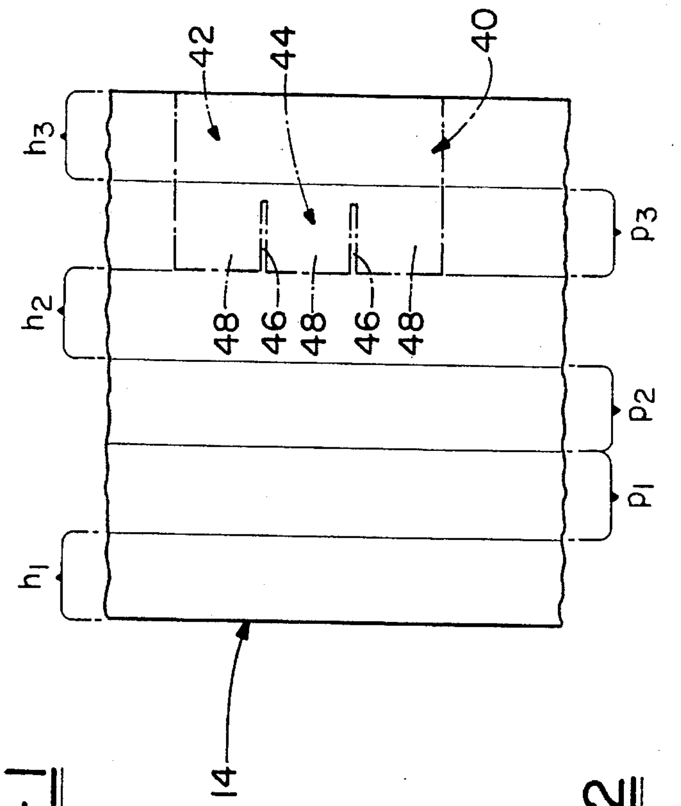
FIG. 2 is a schematic plan view of a portion of the asphaltic strip material having been coated with granules, and showing a roofing shingle, made by the method of the present invention, as a part thereof.

Asphaltic strip 14 is shown in more detail in FIG. 2 as containing six distinct regions or lanes including three headlap lanes h1, h2, and h3, and three prime lanes p1, p2, and p3. A roofing shingle 40 is shown in ghost and may be cut from asphaltic strip 14 as shown. In this manner, three roofing shingles of any length desired may be cut from each such length of asphaltic strip 14. Each shingle would contain one headlap lane h1, h2, or h3, and one respective adjacent prime lane p1, p2, or p3. Accordingly, shingle 40 includes a headlap region 42 and a prime region 44. The headlap region 42 of shingle 40 is that portion which is covered by adjacent shingles when shingle 40 is ultimately installed upon a roof. The prime region 44 of shingle 40 is that portion which remains exposed when shingle 40 is ultimately installed upon a roof. It is upon the prime region 44 therefore that the growth of fungus, algae, or other such microorganisms may produce an unsightly appearance which is to be avoided. Shingle 40 is preferably cut from asphaltic strip 14 to be three feet long by one foot wide. Shingle 40 also preferably includes two cut-out regions 46 which act to form three tabs 48. Those skilled in the art will recognize that asphaltic strip 14 may be a wide variety of widths to allow different numbers of shingles to be cut therefrom. For example, some roofing shingle manufacturing plants utilize an asphaltic strip 14 which is sufficiently wide to allow four, one foot wide shingles to be cut therefrom. This wider asphaltic strip would include an additional headlap region, and an additional prime region. Those skilled in the art will also recognize that different size roofing shingles, in terms of length and/or width, may be cut from asphaltic strip 14.

Asphaltic strip 14 is next caused to pass, using means known in the art, beneath first granule applying means, such as a hopper or feeder 16. The hopper or feeder 16 deposits a predetermined amount of anti-microorganism granules 18 onto prime lanes p1, p2, and p3, of asphaltic strip 14. The hopper or feeder 16 may be a fluted roll hopper having a gated output orifice as is well known in the art, or any other hopper or feeder as is known in the art. In the preferred embodiment, however, a vibratory feeder is used as first hopper 16 to dispense the anti-microorganism granules 18. A vibratory feeder deposits a more uniform "curtain" of granules 18 having well defined edges over the desired prime lanes p1, p2, p3 of asphaltic strip 14 to uniformly distribute the microorganism granules 18 upon the prime lanes p1,p2,p3 without causing said microorganism resistant granules 18 to be inadvertently applied to the headlap lanes h1,h2,h3. Anti-microorganism granules are typically applied at a range of eight to twelve percent (8%–12%) of the total weight of granules applied to the prime lanes, and a vibratory feeder is thought to provide a more uniform dispensing of this relatively low amount of granules 18. First hopper or feeder 16 preferably has a first output orifice designed to apply granules to prime lanes p1, p2, and a second output orifice designed to apply granules to prime lane p3.

First hopper 16 receives a supply of anti-microorganism granules from a source using any of the numerous means as are known in the art. In using a vibratory feeder as the granule applying means 16, the feeder may be overfed or "choke" fed, wherein the output therefrom is controlled by means of a gate controlled opening at its output 17, and/or by controlling the frequency and amplitude of the vibration of the feeder 16. The gate opening at the output 17 is preferably preset at the desired opening or height while the frequency and amplitude of the vibration of the feeder 16 may vary depending upon the rate at which asphaltic strip 14 is moving beneath the feeder. Alternatively, a weigh scale or a loss-in-weight scale may be used to supply the anti-microorganism granules into first hopper 16 at a predetermined rate to thus control the output of anti-microorganism granules 18 from first hopper 16. In such an arrangement, the input supply of anti-microorganism granules may depend upon, among other things, the speed at which asphaltic strip 14 moves beneath first hopper 16. First hopper 16 may be adapted with any other suitable means known in the art to control the output of granules 18 dispensed therefrom. For example, when first hopper 16 is of the gated output fluted roll type, the speed at which the fluted roll rotates, and consequently the output from the hopper 16, may be manipulated to vary depending upon, among other things, the speed at which asphaltic strip 14 moves beneath first hopper 16.

Anti-microorganism granules 18 are known in the art and are preferably designed to inhibit the growth of algae, fungus, and/or other microorganisms. Anti-microorganism granules may be similar in appearance and composition to ordinary roofing granules as are known in the art or may be another particulate substance such as, for example, small pieces of metallic copper or zinc. Thus, the term granule, as used herein, would include any suitable particulate or particle-like material. The anti-microorganism granules may be made entirely from copper or contain copper or copper compounds. Anti-microorganism roofing granules are available commercially from the Minnesota Mining and Manufacturing Company, St. Paul, Minn., also known as 3M. The quantity of such granules deposited upon the prime lanes p1, p2, and p3 varies depending upon the exact composition of granules utilized. Any such quantities for the various granules are known in the art. It is thought preferable to deposit an amount of algicidal or fungicidal or other such granules at an average of 8% to 12% by weight of the total granules applied to the prime lanes p1, p2, p3 of asphaltic strip 14. For example, if a total of thirty pounds (30 lbs.) of granules stick or adhere to each 100 square feet of prime lane, ideally, 10% or three pounds (3 lbs.) of these granules would be anti-microorganism granules. However, this rate may vary and the invention is not meant to be limited to any particular algicidal or fungicidal granule, or any particular rate of application of such anti-microorganism granules.

Subsequent to anti-microorganism granules 18 being deposited onto prime lanes p1, p2, p3 of asphaltic strip 14, strip 14 passes beneath second granule applicator means such as hopper or blender 22 which preferably dispenses ordinary prime granules 24 onto prime lanes p1, p2, p3 using means known in the art. Numerous types of prime granules are well known in the art and may include, for example, colored granules. Second hopper or blender 22 is preferably a fluted roll type hopper although any variety of hopper known in the art may be utilized to apply the prime granules 24. Second hopper 22 is adapted with any suitable means for controlling the quantity of granules 24 dispensed therefrom, such as an output gate 23. Output of granules 24 is preferably designed to vary, using means known in the art, depending upon the speed at which asphaltic strip 14 moves beneath blender 22. Blender 22 receives a supply of prime granules from a source by any of the numerous means as are well known in the art. Blender 22 typically dispenses several different shades of prime granules 24 at predetermined intervals of prime lanes p1, p2, p3, to provide a more aesthetically pleasing and textured appearance to an installed roof.

The application of headlap granules to the headlap lanes h1, h2, h3 of asphaltic strip 14 preferably occurs after the application of prime granules 24, although it may occur before. Application of the headlap granules, which are lower in cost and less aesthetically pleasing, preferably occurs when asphaltic strip 14 passes beneath third granule applicator means such as hopper or backfall hopper 30 which deposits headlap granules onto the headlap lanes h1, h2, h3 of asphaltic strip 14. Backfall hopper 30 is preferably a fluted roll hopper adapted with any suitable means for controlling the quantity of granules dispensed therefrom, such as an output gate. In addition to receiving backfall headlap granules and backfall prime granules, third hopper 30 preferably receives additional headlap granules from a source by any of the numerous means as are well known in the art. The roll speed and/or the gate opening of backfall hopper 30 may be varied, using means known in the art, depending upon the speed at which asphaltic strip 14 moves beneath backfall hopper 30 to control the output of granules 29.

Slate drum 28 is designed to cause any excess non-adhered granules, both prime and headlap, to be removed from asphaltic strip 14 and to be deposited into backfall hopper 30 for re-application to asphaltic strip 14. By continuously depositing an excess of granules onto asphaltic strip 14, strip 14 is more likely to be completely covered with granules. Due to the fact that prime granules are more expensive than headlap granules, and due to the fact that it is undesirable to have any backfall headlap granules deposited onto the prime lanes p1, p2, p3 of asphaltic strip 14, backfall hopper is preferably designed to keep backfall headlap granules separate from backfall prime granules. In this manner, backfall headlap granules may be re-applied to the headlap lanes h1, h2, h3 of asphaltic strip 14, and backfall prime granules may be reapplied to the prime lanes p1, p2, p3 of asphaltic strip 14. To prevent any backfall headlap granules from being re-applied to the prime lanes p1, p2, p3, some of the backfall prime granules from the areas adjacent to the headlap lanes h1, h2, h3, must be diverted into the backfall headlap supply and are therefore "downgraded" to headlap granules. This causes a waste of some of the relatively expensive prime granules. Those skilled in the art will recognize however that if the very expensive fungicidal, algicidal or other such anti-microorganism granules 18 are applied before the application of the ordinary prime granules 24, substantially all of the anti-microorganism granules 18 will remain adhered to tacky surface of the prime lanes p1, p2, p3 and will not be dislodged by slate drum 28. Those skilled in the art will also recognize that the prime granules which are downgraded to headlap will contain very few or none of the very expensive anti-microorganism granules.

Although the invention has been described in terms of initially applying anti-microorganism granules, secondly applying prime granules, and lastly applying headlap granules, those skilled in the art will recognize that the invention resides in applying a predetermined amount of the anti-microorganism granules 18 to the prime lanes p1, p2, p3, separate from and prior to the application of the ordinary prime granules 24 to the prime lanes p1, p2, p3. Therefore, the application of the headlap granules to the headlap lanes h1, h2, h3 of asphaltic strip 14 may occur before the application of the anti-microorganism granules to the prime lanes p1, p2, p3, or after, or the headlap granules may be applied between the application of the anti-microorganism granules and the prime granules. Additionally, small amounts of other granules may be applied to the prime lanes prior to the application of the anti-microorganism granules provided that the prime lanes are substantially uncovered to allow most of the anti-microorganism granules to stick to the prime lanes.

While the foregoing description has set forth the preferred embodiment of the invention in particular detail, it must be understood that numerous modifications, substitutions and changes can be undertaken without departing from the true spirit and scope of the present invention as defined by the ensuing claims.

What is claimed is:

1. A method of manufacturing a microorganism resistant roofing shingle comprising the steps of:

supplying an asphaltic strip material with a tacky surface having at least one prime lane;

applying prime granules onto said at least one prime lane of said asphaltic strip material to substantially cover said at least one prime lane so that approximately all of said prime granules adhere to said asphaltic strip material;

applying an excessive amount of backfall granules onto said at least one prime lane on top of said prime granules; and prior to applying said prime granules onto said at least one prime lane of said asphaltic strip material, applying anti-microorganism granules onto said at least one prime lane so that nearly 100 percent of the anti-microorganism granules adhere to said asphaltic strip material.

2. A method of manufacturing a microorganism resistant roofing shingle as recited in claim 1, wherein said step of supplying said asphaltic strip material further includes providing said asphaltic strip material with at least one headlap lane, said method further comprising the step of applying headlap granules to said at least one headlap lane of said asphaltic strip material.

3. A method of manufacturing a microorganism resistant roofing shingle as recited in claim 1, wherein the step of supplying said asphaltic strip material includes supplying said asphaltic strip material as a continuously moving strip, and said step of applying said anti-microorganism granules is carried out with a fluted roll hopper having a gate controlled output orifice which applies said anti-microorganism granules to said strip as said strip is moved beneath said hopper fluted roll.

4. A method of manufacturing a microorganism resistant roofing shingle as recited in claim 3, further comprising the step of varying the gate controlled output orifice of said fluted roll hopper depending upon the linear speed at which said asphaltic strip material moves beneath said fluted roll hopper.

5. A method of manufacturing a microorganism resistant roofing shingle as recited in claim 1, wherein the step of supplying said asphaltic strip material includes supplying said asphaltic strip material as a continuously moving strip, and said step of applying said anti-microorganism granules is carried out with a vibratory feeder which applies said anti-microorganism granules to said asphaltic strip material moved beneath said vibratory feeder.

6. A method of manufacturing a microorganism resistant roofing shingle as recited in claim 5, wherein said vibratory feeder includes a gate controlled output orifice.

7. A method of manufacturing a microorganism resistant roofing shingle as recited in claim 5, further comprising the step of varying a gate controlled output orifice of said vibratory feeder depending upon the linear speed at which said asphaltic strip material moves beneath said vibratory feeder.

8. A method of manufacturing a microorganism resistant roofing shingle as recited in claim 6, further comprising the step of varying the a gate controlled output orifice of said vibratory feeder depending upon the linear speed at which said asphaltic strip material moves beneath said vibratory feeder.

9. A method of manufacturing a microorganism resistant roofing shingle as recited in claim 2, wherein the step of supplying said asphaltic strip material includes supplying said asphaltic strip material as a continuously moving asphaltic strip material, and said step of applying said anti-microorganism granules is carried out with a vibratory feeder which applies said anti-microorganism granules to said asphaltic strip material moved beneath said vibratory feeder.

10. A method of manufacturing a microorganism resistant roofing shingle as recited in claim 1, wherein said step of applying anti-microorganism granules includes the step of controlling the amount of said anti-microorganism granules applied to said at least one prime lane of said asphaltic strip material so that said anti-microorganism granules constitute a predetermined percentage of the total weight of all granules which ultimately adhere to said at least one prime lane wherein said predetermined percentage is a sufficient amount to inhibit the growth of algae, fungus, and/or microorganisms.

11. A method of manufacturing a microorganism resistant roofing shingle as recited in claim 10, wherein said predetermined percentage is in the range of 8%–12% of the total weight of all granules which ultimately adhere to said at least one prime lane.

12. A method of manufacturing a microorganism resistant roofing shingle as recited in claim 1, wherein said step of applying anti-microorganism granules includes the step of uniformly distributing said anti-microorganism granules upon said at least one prime lane.

13. A method of applying anti-microorganism granules to a continuously moving asphaltic strip material with a tacky surface comprising the steps of:

applying prime granules to at least a first portion of said asphaltic strip material to substantially cover said at least first portion so that approximately all of said prime granules adhere to said asphaltic strip material;

applying an excessive amount of backfall granules onto said first portion of said asphaltic strip material on top of said prime granules; and prior to applying said prime granules onto said at least a first portion of said asphaltic strip material, applying anti-microorganism granules onto said at least a first portion so that nearly 100 percent of the anti-microorganism granules adhere to said asphaltic strip material.

14. A method of applying anti-microorganism granules to a continuously moving asphaltic strip material as recited in claim 13, wherein said step of applying anti-microorganism granules is carried out with a vibratory feeder which applies said anti-microorganism granules to said asphaltic strip material moved beneath said vibratory feeder.

15. A method of applying anti-microorganism granules to a continuously moving asphaltic strip material as recited in claim 13, wherein said step of applying anti-microorganism granules includes the step of controlling the amount of said anti-microorganism granules applied to said asphaltic strip material so that said anti-microorganism granules constitute a predetermined percentage of the total weight of all granules which ultimately adhere to said first portion of said asphaltic strip material wherein said predetermined percentage is a sufficient amount to inhibit the growth of algae, fungus, and/or microorganisms.

16. A method of applying anti-microorganism granules to a continuously moving asphaltic strip material as recited in claim 15 wherein said predetermined percentage is in the range of 8%–12% of the total weight of all granules which ultimately adhere to said first portion of said asphaltic strip material.

17. A microorganism resistant shingle produced in accordance with the process of claim 1.

18. A microorganism resistant shingle produced in accordance with the process of claim 2.

19. A microorganism resistant shingle produced in accordance with the process of claim 5.

* * * * *